(12) United States Patent
Min et al.

(10) Patent No.: US 11,391,369 B2
(45) Date of Patent: Jul. 19, 2022

(54) SHIFT-BY-WIRE DEVICE AND TRANSMISSION METHOD USING SAME

(71) Applicant: HYUNDAI KEFICO CORPORATION, Gyeonggi-do (KR)

(72) Inventors: Young Dae Min, Incheon (KR); Ho Young Kim, Gyeonggi-do (KR); Ji Hwan Oh, Seoul (KR); Nam Kyu Kim, Seoul (KR)

(73) Assignee: Hyundai Kefico Corporation, Gyeonggi-do (KR)

( * ) Notice: Subject to any disclaimer, the term of this patent is extended or adjusted under 35 U.S.C. 154(b) by 0 days.

(21) Appl. No.: 17/059,281

(22) PCT Filed: May 30, 2019

(86) PCT No.: PCT/KR2019/006487
§ 371 (c)(1),
(2) Date: Nov. 27, 2020

(87) PCT Pub. No.: WO2019/231249
PCT Pub. Date: Dec. 5, 2019

(65) Prior Publication Data
US 2021/0140540 A1 May 13, 2021

(30) Foreign Application Priority Data
May 30, 2018 (KR) .................. 10-2018-0061910

(51) Int. Cl.
*F16H 59/08* (2006.01)
*F16H 61/32* (2006.01)
*F16H 61/02* (2006.01)

(52) U.S. Cl.
CPC .............. *F16H 61/32* (2013.01); *F16H 59/08* (2013.01); *F16H 61/0213* (2013.01); *F16H 2061/326* (2013.01)

(58) Field of Classification Search
CPC ...... F16H 61/32; F16H 59/08; F16H 61/0213; F16H 2061/326
See application file for complete search history.

(56) References Cited

U.S. PATENT DOCUMENTS

| 2003/0000328 A1* | 1/2003 | Hayashi | .................. F16H 61/32 |
| | | | 74/473.12 |
| 2003/0222617 A1* | 12/2003 | Nakai | ...................... H02P 8/42 |
| | | | 318/701 |

(Continued)

FOREIGN PATENT DOCUMENTS

| JP | 2007-040367 A | 2/2007 |
| JP | 2016-075364 A | 5/2016 |

(Continued)

*Primary Examiner* — David M Fenstermacher
(74) *Attorney, Agent, or Firm* — Fox Rothschild LLP

(57) ABSTRACT

The present invention relates to a shift-by-wire (SBW) device and, more specifically, to an actuator and reduction gear structure of a shift-by-wire device. A shift-by-wire device according to the present invention comprises: a housing; a motor which generates torque by means of an applied current; a hollow rotor shaft; a reduction gear which receives the transmission of the torque of the motor, converts same and transmits same to an output; an output shaft which passes through inside the rotor shaft, has an encoder magnet provided on one end thereof, has the other end directly connected to a manual shaft, and transmits the torque increased by means of the reduction gear to a detent plate; and a controller disposed inside the housing and for detecting the position of the output from the encoder magnet.

10 Claims, 6 Drawing Sheets

(56) References Cited

U.S. PATENT DOCUMENTS

| | | | |
|---|---|---|---|
| 2009/0078066 A1 | 3/2009 | Schuler | |
| 2013/0110365 A1* | 5/2013 | Kimura | F16H 61/32 701/65 |
| 2014/0343807 A1* | 11/2014 | Maki | F16H 63/18 701/51 |
| 2016/0138704 A1* | 5/2016 | Watanabe | G05G 5/08 74/473.23 |
| 2019/0017593 A1* | 1/2019 | Lee | F16H 61/32 |
| 2019/0093758 A1* | 3/2019 | Kelly | F16H 63/42 |
| 2019/0203831 A1* | 7/2019 | Beattie | F16H 61/24 |
| 2019/0203832 A1* | 7/2019 | Heo | F16H 61/24 |
| 2020/0166122 A1* | 5/2020 | Yamamoto | F16H 63/40 |
| 2020/0370644 A1* | 11/2020 | Sakaguchi | F16H 61/32 |
| 2021/0071754 A1* | 3/2021 | Kim | F16H 59/105 |
| 2021/0088127 A1* | 3/2021 | Ko | F16H 59/105 |
| 2021/0131555 A1* | 5/2021 | Ko | F16H 59/105 |
| 2021/0172512 A1* | 6/2021 | Soave | F16H 63/483 |

FOREIGN PATENT DOCUMENTS

| | | |
|---|---|---|
| JP | 2016-080078 A | 5/2016 |
| KR | 10-1089861 B1 | 12/2011 |

\* cited by examiner

SHIFT-BY-WIRE DEVICE AND TRANSMISSION METHOD USING SAME

CROSS-REFERENCE TO RELATED APPLICATIONS

This application is a National Phase application filed under 35 USC 371 of PCT International Application PCT/KR2019/006487 with an International Filing Date of May 30, 2019, which claims priority from Korean Application 10-2018-0061910 filed on May 30, 2018. The entire contents of these applications are incorporated herein by reference in their entirety.

TECHNICAL FIELD

The present invention relates to a shift-by-wire (SBW) device and a shifting system using the same, and more specifically, to structures of an actuator and a reduction gear of an SBW device.

BACKGROUND ART

Recently, automobile technology has been showing a technological trend in which various mechanical devices are replaced by electric systems, reflecting consumer demand for convenience facilities.

In the conventional shift-by-cable (SBC) method, when a shift lever of a vehicle is moved, a detent lever is rotated by a cable, and a manual valve is moved by the rotation of the detent lever, and flow paths of P, R, N, and D stages on a valve body are opened.

In the shift-by-wire (SBW) method in which a shift operation unit of a transmission is made by being electronically controlled, all mechanism units, which were mechanically operated, are changed to be controlled by electricity. Since the SBW method has no mechanical operation unit (cable or mechanical manual valve) as compared to the conventional SBC method, the SBW method has an advantage in that a weight of the transmission is reduced and a layout configuration is simple.

However, since the mechanical components are eliminated, the SBW method has a problem in that an emergency situation such as being unable to control an actuator due to an electric and/or electronic signal error may occur.

In the conventional SBW technology, the driver's intention to shift is transmitted to an actuator by a controller, and a final operating force is transmitted to a reduction gear directly connected to the actuator and to a manual shaft of a shift output stage.

In such a conventional technology, there is a problem in that mechanical and/or electrical errors may occur when each of a position of an actuator, a position of a sensor magnet, and a position of an inhibitor switch sensor is sensed.

DISCLOSURE

Technical Problem

The present invention is directed to providing a shift-by-wire (SBW) device in which an SBW actuator and a reduction gear are integrated with a controller and a structure for sensing a position of a manual shaft is improved, and a shifting system using the same.

Technical Solution

One aspect of the present invention provides a shift-by-wire (SBW) device including a housing, a motor configured to generate torque using an applied current, a rotor shaft in a hollow type, a reduction gear configured to receive the torque of the motor, convert the generated torque, and transmit the converted torque to an output shaft, an output shaft shaft which has one end provided with an encoder magnet and the other end directly connected to a manual shaft, passes through an inner side of the rotor shaft, and transmits the torque increased by the reduction gear to a detent plate, and a controller which is disposed inside the housing and senses a position of the output shaft from the encoder magnet.

One aspect of the present invention provides a shifting method using an SBW device, which includes receiving an operation request from a transmission controller in response to driver's selection from among P, R, N, and D stages, applying a current to a motor to generate power, rotating an output shaft shaft by a position of the selected shift stage, and transmitting the power to a manual shaft, and sensing a rotational position of the motor and a position of an output shaft in real time, stopping the driving of the motor, and then transmitting information about the shift stage to the transmission controller.

Advantageous Effects

In the conventional shift-by-cable (SBC) method and the conventional shift-by-wire (SBW) method in which a controller is separately provided from an SBW, a position of a shift stage is sensed by an inhibitor switch positioned between a motor and a manual shaft and is transmitted to a transmission control unit (TCU) so that shift control is performed. Conversely, according to embodiments of the present invention, in an SBW method in which a controller is integrally provided with an SBW, a magnet is provided at an end of an SBW output shaft and is sensed by a position sensor of the integrated controller, and thus an inhibitor switch is eliminated. Therefore, the number of components can be reduced, thereby reducing costs.

According to the present invention, a rotational shaft of a motor is formed to be hollow and an output shaft passes through an inner side of the hollow rotational shaft and extends to a controller, and thus it is possible to directly sense a position of the manual shaft and it is possible to minimize a position error caused by a backlash of a reduction gear.

Effects of the present invention are not limited to the above-described effects and other unmentioned effects may be clearly understood by those skilled in the art from the following descriptions.

MODES OF THE INVENTION

The above-described objects of the present invention, other objects, advantages, features, and methods of achieving the same will be clearly understood with reference to the accompanying drawings and the following detailed embodiments.

However, the present invention is not limited to the embodiments to be disclosed but may be implemented in various different forms. The embodiments are provided in order to fully explain the present invention and fully explain the scope of the present invention for those skilled in the art. The scope of the present invention is defined by the appended claims.

Meanwhile, the terms used herein are provided only to describe the embodiments of the present invention and not for purposes of limitation. Unless the context clearly indicates otherwise, the singular forms include the plural forms. It will be understood that the terms "comprise" and/or "comprising" when used herein, specify some stated components, steps, operations, and/or elements, but do not preclude the presence or addition of one or more other components, steps, operations, and/or elements.

Hereinafter, in order to facilitate those skilled in the related art to understand, problems of the related art to be solved by the present invention will be described first and then exemplary embodiments of the present invention will be described.

Figure 1:
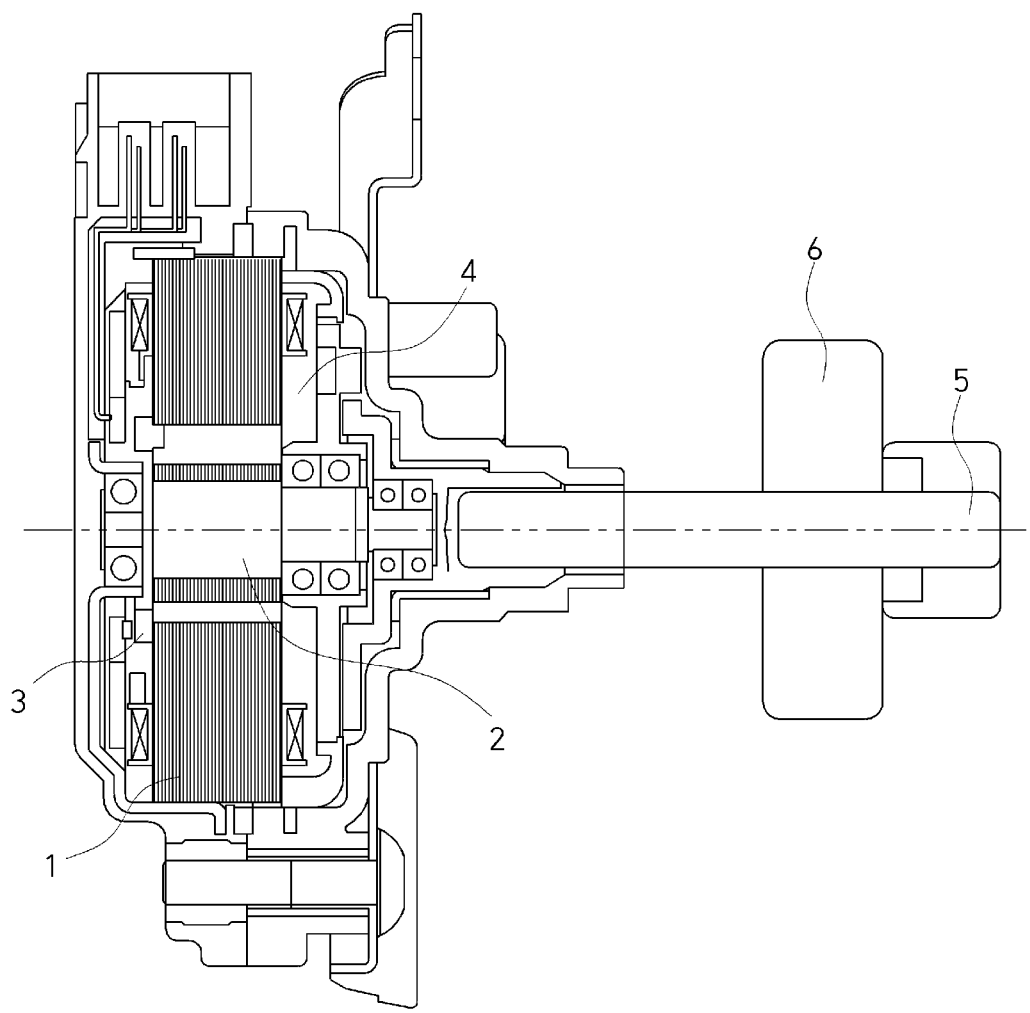
FIG. 1 is a cross-sectional view illustrating a shift-by-wire (SBW) device from which a controller is separated according to a related art.

FIG. 1 is a cross-sectional view illustrating a shift-by-wire (SBW) device from which a controller is separated according to a related art.

The SBW device from which a controller is separated according to the related art includes a motor 1, a rotor shaft 2, a rotor magnet 3, a reduction gear 4, and a manual shaft 5. As described above, in order to check a position of a shift stage, the SBW device includes an inhibitor switch 6.

According to the related art, a final position of an output stage is sensed by sensing a position of a rotor.

According to the related art, there is a problem in that the inclusion of an inhibitor switch causes a cost increase, and a position error caused by a backlash of the reduction gear occurs.

In addition, according to the related art, a position of the manual shaft of the final output stage is not directly sensed and the position of the rotor is sensed and estimated, and thus there is a problem in that accuracy of position sensing is reduced.

The present invention is proposed to address the above-described problems. According to the present invention, by sensing a position of a shift stage using a magnet attached to one end of an output shaft shaft and using a magneto resistive (MR) sensor of a controller, it is possible for the controller to accurately check a current position of the shift stage.

An SBW device according to an embodiment of the present invention includes a motor which generates torque, a reduction gear which increases the torque to a level sufficient for driving a system (shift) and converts the torque, and a controller which controls driving of the motor, senses a position of the motor and a position of an output shaft, and transmits the positions to a transmission control unit (TCU). Hereinafter, the SBW device according to the embodiment of the present invention will be described with reference to FIGS. 2 to 4.

Figure 2:
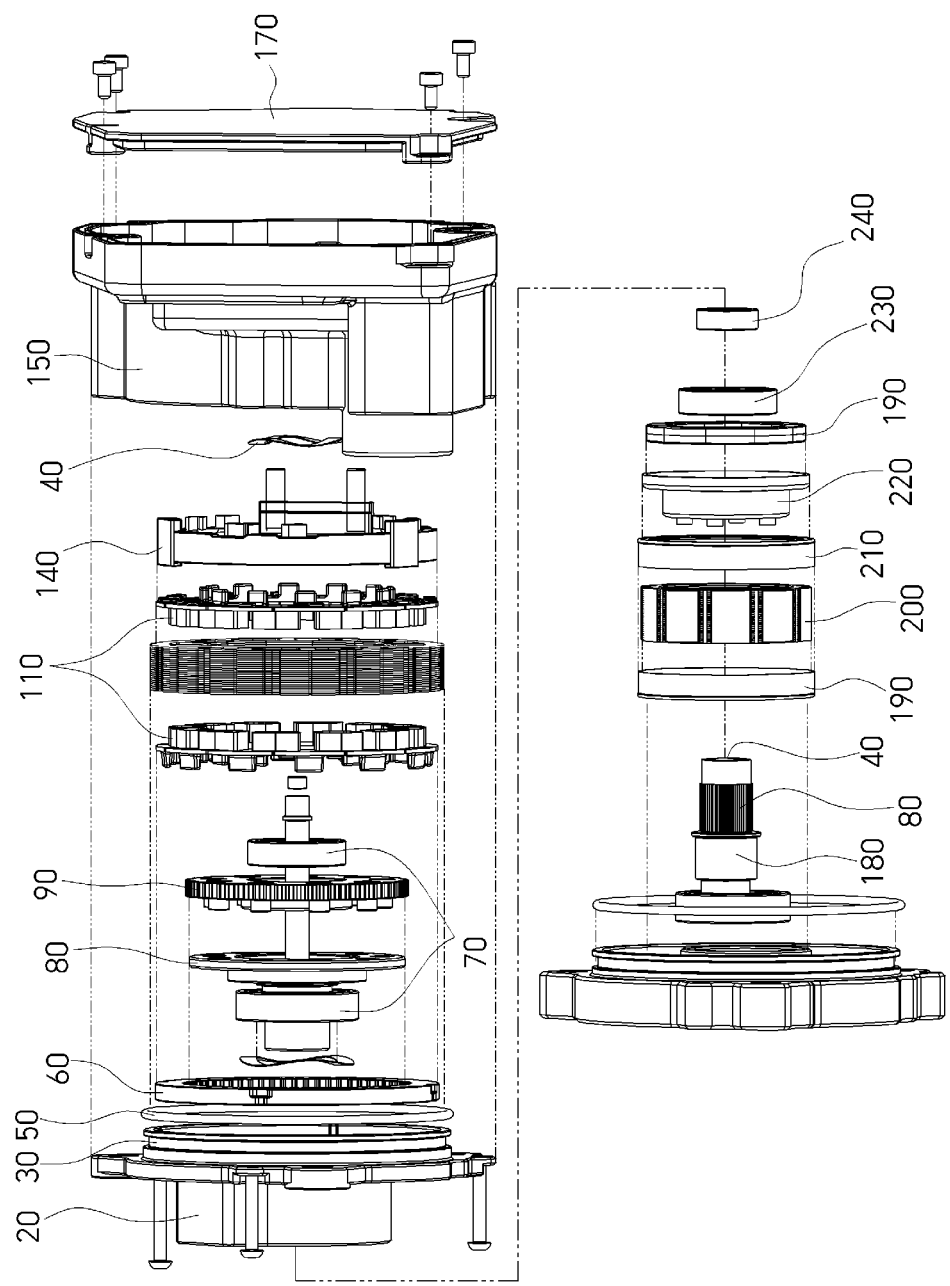
FIG. 2 is a view illustrating a configuration of components of an SBW device according to an embodiment of the present invention.

FIG. 2 illustrates a configuration of components of the SBW device according to the embodiment of the present invention. The SBW device includes an air vent cover 20, a gear cover 30, a wave washer 40, an O-ring 50, an outer gear 60, a bearing, an output shaft shaft 80, an inner gear 90, a motor cover, an insulator 110, a stator core, a bus bar mold, a bus bar 140, a housing 150, a gasket, a housing cover 170, a rotor shaft 180, a rotor can 190, a rotor core 200, a motor magnet 210, a rotor magnet yoke 220, a motor sensor magnet 230, and an encoder magnet 240.

The SBW device according to the present invention includes the housing 150, a motor 300 which generates torque using a current applied thereto, a hollow rotor shaft 180, a reduction gear 400 which receives the generated torque of the motor 300, convert the torque, and transmit the converted torque to an output shaft, the output shaft shaft 80 which has one end provided with the encoder magnet 240 and the other end directly connected to a manual shaft, passes through an inner side of the rotor shaft 180, and transmits the torque increased by the reduction gear 400 to a detent plate, and a controller 250 which is disposed in the housing 150 and senses a position of the output shaft from the encoder magnet 240.

The controller 250 includes a position sensor 251 disposed to face the encoder magnet 240 and a Hall effect sensor 252 disposed to face the motor sensor magnet 230.

According to the embodiment of the present invention, as described above, a function of sensing the position of the shift stage using the encoder magnet 240 attached to one end of the output shaft shaft 80 and using the controller 250 may serve as and replace the inhibitor switch according to the conventional method, thereby reducing costs.

A brushless direct current electric (BLDC) motor or a switched reluctance (SR) motor is applied to the motor 300 according to the embodiment of the present invention.

The controller 250 according to the embodiment of the present invention includes the position sensor 251 and the Hall effect sensor 252, as described above, and is disposed inside the housing 150. The controller 250 receives information on a rotational position of the motor 300 from the motor sensor magnet 230 disposed adjacent to the motor 300 and senses a position of the rotor.

A force (rotation speed) formed by reducing a force of the motor rotating the rotor shaft 180 as an axis by the reduction gear is transmitted to the output shaft shaft 80, and the encoder magnet 240 which is assembled to one end of the output shaft shaft 80 transmits information of a rotational angle of the output shaft shaft 80 to the position sensor 251 of the controller 250.

In this case, the controller 250 embedded in the SBW device checks a position of the rotational angle of the output shaft shaft 80 using an output value of the position sensor 251, performs a function such as movement to or stopping at a specific position, and enables a transmission to shift from a P stage to a R, N, or D stage or from a D stage to a P stage, and at the same time, provides (displays) a current position of the rotational angle on the upper controller and the driver in the form of "P," "R," "N," or "D."

A current flows into the motor 300 using the controller 250, and the motor 300 generates torque (power) using a current applied to a stator and using an electromagnetic force generated between permanent magnets of the rotor.

The stator, the rotor, and other components of the motor are assembled between the housing 150 and the motor cover to block the inflow of an external force, moisture, or dust.

The rotor shaft 180 is involved in the torque of the motor 300 and the output shaft shaft 80 is involved in torque of an actuator. The rotor shaft 180 transmits the torque generated by the motor 300 through a hollow eccentric shaft thereof.

The reduction gear 400 according to the embodiment of the present invention includes a cycloid gear which rotates according to eccentricity and transmits power according to the eccentricity to the output shaft.

The reduction gear 400 increases the torque transmitted from the motor 300 according to a reduction ratio according to a pitch circle diameter (PCD) and the number of teeth of each of the inner gear 90 and the outer gear 60 and transmits the increased torque to the output shaft.

The gear cover 30 of the reduction gear 400 supports the outer gear 60 and the bearing supports the inner gear 90, and thus it is possible to rotate and/or fix the gear.

As described above, the inner gear 90 of the reduction gear 400 is eccentrically assembled so that the converted torque is transmitted to the output shaft according to the eccentricity.

A space in which gears and other components are assembled is provided between the gear cover 30 and the motor cover 100 to block the inflow of an external force, moisture, or dust.

The controller 250 according to the embodiment of the present invention uses pre-trained reference data to sense the position of the output shaft from the encoder magnet 240, check the current position of the shift stage, and control the movement of the motor 300.

That is, according to the embodiment of the present invention, the encoder magnet 240 is provided at an end of the output shaft, and the controller 250 integrated in the housing 150 senses the position of the output shaft from the encoder magnet 240 and serves as an inhibitor switch, thereby replacing the inhibitor switch according to the related art. Therefore, the number of components may be reduced, and thus cost reduction may be expected.

As described above, the rotor shaft 180 is formed in the form of a hollow and the output shaft passes through the inner side of the rotor shaft 180 and extends to an area in which the controller 250 is positioned, and thus the controller 250 may directly sense the position of the manual shaft directly connected to the output shaft shaft 80. Therefore, it is possible to minimize an error caused by a backlash of the reduction gear.

Figure 5:
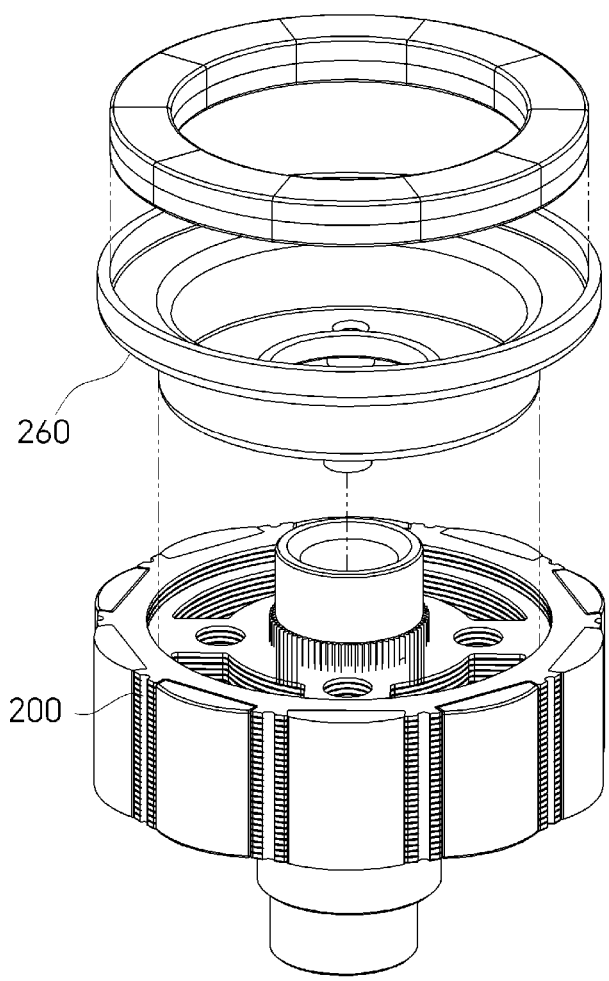
FIG. 5 is a view illustrating a structure for preventing detachment of a sensing plate of the SBW device according to the embodiment of the present invention.

FIG. 5 is a view illustrating a structure for preventing detachment of a sensing plate of the SBW device according to the embodiment of the present invention.

According to the related art, there is a problem in that a sensing plate may be disassembled in a direction of a shaft due to vibration or an external force, and thus it is impossible to check the position of the motor for controlling when disassembling, and it is impossible to shift.

A sensing plate 260 according to the embodiment of the present invention is assembled to be forcibly fitted between an emboss and a hole of the rotor core 200 and is assembled between the rotor core 200 and the bearing. Therefore, the sensing plate 260 is robust against vibration or a force applied from the outside and prevents the motor sensor magnet 230 from being detached.

Figure 3:
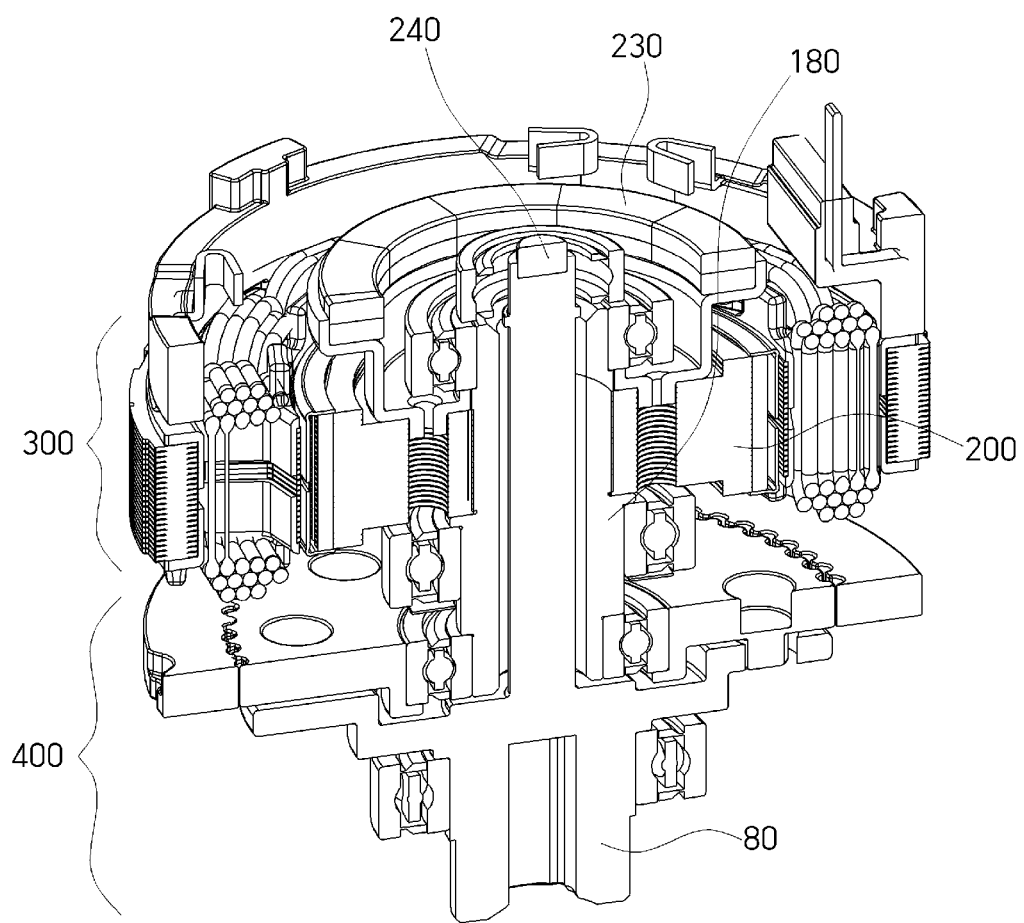
FIG. 3 is a cross-sectional view of the SBW device according to the embodiment of the present invention.
Figure 4:
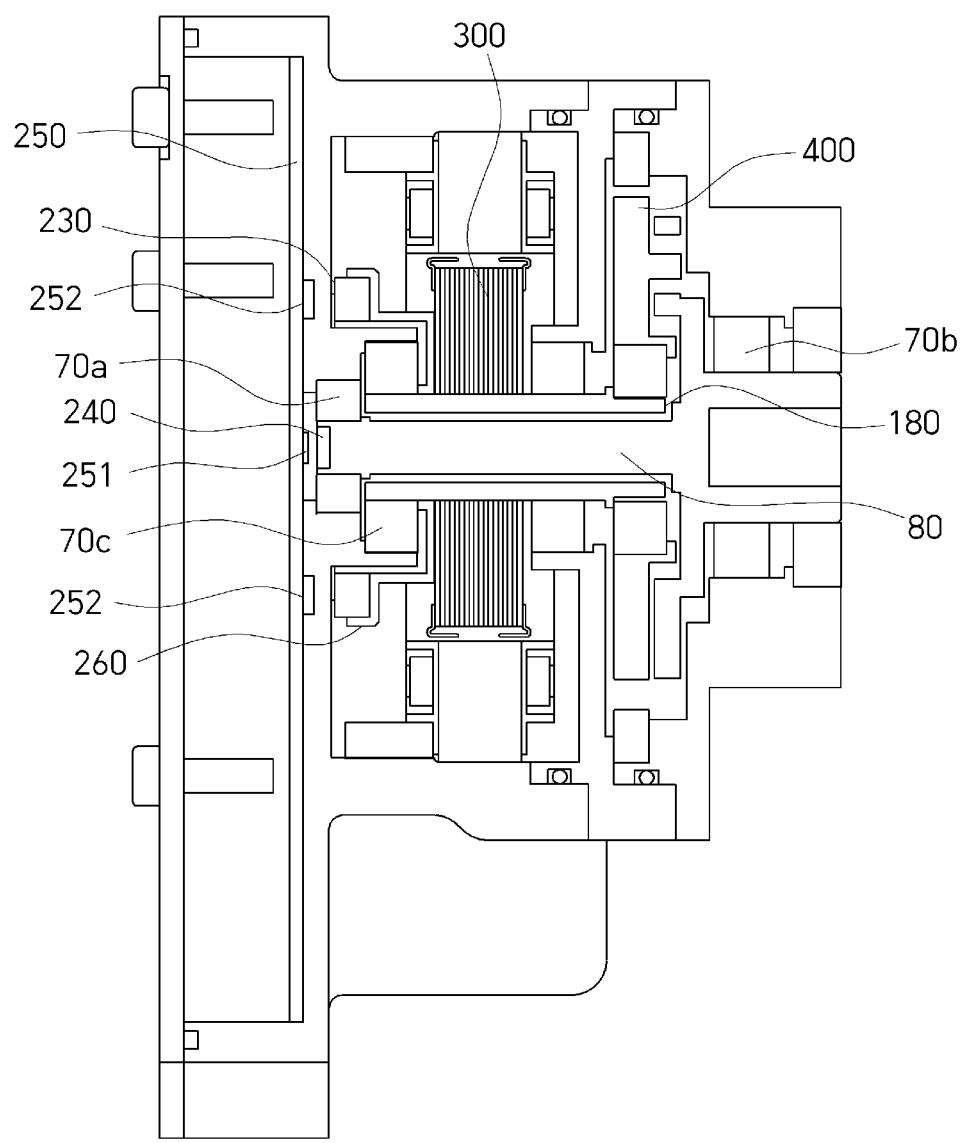
FIG. 4 is a side sectional view of the SBW device according to the embodiment of the present invention.

Referring to FIGS. 2 to 4, the motor sensor magnet 230 according to the embodiment of the present invention is a component that informs the Hall effect sensor 252 of a rotational position of the rotor. When the motor sensor magnet 230 is out of position in a lateral direction, it is impossible to control and shift.

The sensing plate 260 according to the embodiment of the present invention has an end portion disposed in a bent shape such as an "L" shape to prevent the lateral detachment of the motor sensor magnet 230.

Figure 6:
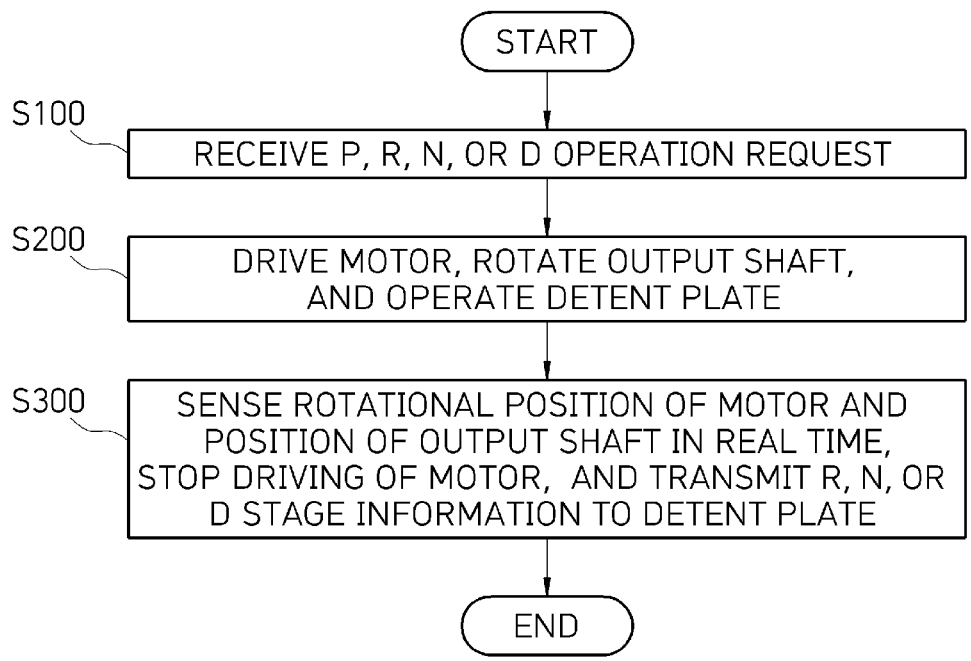
FIG. 6 is a flowchart illustrating a shifting method using the SBW device according to the embodiment of the present invention.

FIG. 6 is a flowchart illustrating a shifting method using the SBW device according to the embodiment of the present invention.

Before describing the shifting method shown in FIG. 6, when a position of a P stage is sensed, it is determined whether an IG start signal is input. When the IG start signal is not input, the SBW device enters a standby state, and when the IG start signal is input, a start relay operation signal is output.

In operation S100, when a driver selects one from among R, N, and D stages, the TCU transmits request information for positioning a lever at the R, N, or D stage using a position of the selected stage and an SBW actuator control unit (SCU) receives the request information.

The SCU is disposed in the housing of the SBW device and applies a current to the motor to generate power (S200).

In operation S200, the motor rotates the output shaft shaft by the P, R, N, or D position using the generated power and transmits the power to the manual shaft.

In this case, the torque of the motor is transmitted through the hollow rotor shaft, and the torque increased by the reduction gear is transmitted to the detent plate through the output shaft shaft which passes through the inner side of the rotor shaft and is directly connected to the manual shaft.

The SCU senses a rotational position of the motor and a position of the output shaft in real time, stops the driving of the motor, and then transmits information about the shift stage to the TCU (S300).

In this case, the SCU receives the rotational position of the motor from the motor sensor magnet disposed adjacent to the motor, senses the position of the rotor, and senses the position of the output shaft from an encoder magnet disposed on one end of the output shaft shaft.

That is, according to the embodiment of the present invention, the encoder magnet is provided at an end of the output shaft, and the SCU integrated in the housing of the SBW device senses the position of the output shaft from the encoder magnet 240 and serves as an inhibitor switch, thereby replacing the inhibitor switch according to the related art with the encoder magnet. Therefore, the number of components may be reduced, thereby reducing costs.

While the present invention has been described with reference to the exemplary embodiments, it will be understood by those skilled in the art that various changes in form and details may be made without departing from the spirit and scope of the present invention. Therefore, the exemplary embodiments should be considered in a descriptive sense only and not for purposes of limitation. The scope of the present invention is defined not by the detailed description of the present invention but by the appended claims and encompasses all modifications and equivalents that fall within the scope of the appended claims and will be construed as being included in the present invention.

The invention claimed is:

1. A shift-by-wire (SBW) device comprising:
   a housing;
   a motor configured to generate torque using a current applied thereto;
   a rotor shaft that is hollow;

a reduction gear configured to receive the generated torque of the motor, convert the generated torque, and transmit the converted torque to an output shaft;

an output shaft shaft which has one end provided with an encoder magnet and the other end directly connected to a manual shaft, passes through an inner side of the rotor shaft, and transmits the torque increased by the reduction gear to a detent plate; and a controller which is disposed inside the housing and determines a position of the output shaft from the encoder magnet.

2. The SBW device of claim 1, wherein the controller includes a position sensor disposed to face the encoder magnet and a Hall effect sensor disposed to face a motor sensor magnet.

3. The SBW device of claim 2, wherein the controller receives information on a rotational position of the motor from the motor sensor magnet disposed adjacent to the motor and determines a position of a rotor.

4. The SBW device of claim 2, wherein the motor sensor magnet is forcibly fitted into a hole of a rotor core and has one end fixed by a sensing plate formed in a bent shape such as an "L" shape so that lateral detachment thereof is prevented.

5. The SBW device of claim 1, wherein the rotor shaft transmits the torque of the motor through a hollow eccentric shaft.

6. The SBW device of claim 1, wherein the reduction gear includes a cycloid gear that rotates according to eccentricity to transmit power according to the eccentricity to the output shaft.

7. The SBW device of claim 1, wherein the controller uses pre-trained reference data to determine the position of the output shaft from the encoder magnet, check a current position of a shift stage, and control an operation of the motor.

8. A shifting method using a shift-by-wire (SBW) device, comprising:
(a) a step of receiving an operation request from a transmission controller in response to driver's selection among P, R, N, and D stages;
(b) a step of, by an SBW actuator controller which is disposed inside a housing of the SBW device, applying a current to a motor to generate power, rotating an output shaft shaft by a position of the selected shift stage, and transmitting the power to a manual shaft; and
(c) a step of, by the SBW actuator controller, determining a rotational position of the motor and a position of an output shaft in real time, stopping driving of the motor, and then transmitting information about the shift stage to the transmission controller.

9. The shifting method of claim 8, wherein torque of the motor is transmitted through a rotor shaft that is hollow in response to applying the current to the motor to generate power, and the torque increased by a reduction gear is transmitted to a detent plate through the output shaft shaft which passes through an inner side of the rotor shaft and is directly connected to the manual shaft.

10. The shifting method of claim 8, wherein the rotational position of the motor is received from a motor sensor magnet in response to determining the rotational positon of the motor, the motor sensor magnet disposed adjacent to the motor so that a position of a rotor is determined and the position of the output shaft is determined from an encoder magnet disposed on one end of the output shaft shaft.

* * * * *